United States Patent Office 3,326,861
Patented June 20, 1967

3,326,861
SHAPING CROSSLINKED POLYURETHANES BY PARTICULATION AND ADDITION OF AN ORGANIC POLYISOCYANATE
Robert L. Sandridge, Proctor, W. Va., assignor to Mobay Chemical Company, Pittsburgh, Pa., a corporation of Delaware
No Drawing. Filed Oct. 21, 1965, Ser. No. 500,337
7 Claims. (Cl. 260—75)

This invention relates to polyurethane plastics and more particularly, to a method of shaping cross-linked polyurethane polymers by the application of heat and pressure. This application is a continuation-in-part of U.S. application Ser. No. 229,491, now abandoned.

It has been heretofore known to prepare polyurethane elastomers by reaction of a polymeric active hydrogen containing compound, a chain extending agent such as a glycol, amino alcohol or a diamine and an organic diisocyanate. Several procedures have been utilized to make a finished article. The reaction ingredients can be mixed, cast into a mold and baked to prepare a crosslinked article having the shape of the mold. The reaction ingredients can be mixed and permitted to react for only a short time. The reaction is interrupted before substantial crosslinking occurs and the polymer is processed by customary thermoplastic techniques such as injection molding, extrusion, calendering or the like. In the two heretofore mentioned techniques, an excess of organic polyisocyanate is used in the reaction recipe. In a third fabricating technique, the reaction ingredients are mixed and reacted. The material is then worked into a plastic state on a rubber mill at which time more isocyanate is added. The gummy material is then shaped by compression molding. In all of these methods, the urethane polymer is shaped into the article to be produced before substantial crosslinking takes place because once crosslinking occurs, the polymer cannot be processed at temperatures below its degradation temperature unless it is degraded by steam, for example, and then again reacted with an additional amount of isocyanate.

This presents a problem only in the second technique mentioned above because the articles of manufacture are shaped from a liquid mix in the casting technique and compression molded in the millable gum technique. However, with regard to processing by thermoplastic methods, the reaction must be interrupted before substantial crosslinking occurs or the material cannot be processed at temperatures below the degradation temperature or the products do not achieve the desired configuration.

Techniques have been proposed such as in U.S. Patent 2,729,618 wherein plasticizers can be added to soften the overcured or crosslinked material to a state in which it can be remolded; however, mechanical properties of such an article are inferior to those made from the original semi-cured elastomer.

Another method of reclaiming disclosed in U.S. Patent 2,729,618 consists of hydrolytic degradation of the crosslinked polymer by steam or to form a product which can subsequently be reacted with diisocyanate and then molded by heat and pressure. This procedure creates problems by the fact that water is necessarily introduced into the polymer. This residual water and also products from the hydrolysis of ester linkages such as COOH, will react when the final diisocyanate is added to form $CO_2$ gas which may cause bubbles in the final product. It is also known that a high water content in the reaction components may be detrimental to the physical properties of the finally molded material. The importance of excluding water is discussed in U.S. patent application Ser. No. 163,870.

It is, therefore, an object of this invention to provide a method of rendering crosslinked polyurethane polymers processable by heat and pressure at temperatures below the heat degradation temperature. It is another object of this invention to provide a method of shaping crosslinked polyurethane polymers. It is another object of this invention to provide a method for improving the physical properties and processing characteristics of overcured thermoplastic polyurethanes. It is still another object of this invention to provide a method of utilizing the scrap material obtained in molding techniques. It is a further object of this invention to provide a method of utilizing heretofore useless crosslinked polyurethane polymers.

The foregoing objects and others are accomplished in accordance with this invention generally speaking by providing a method for shaping crosslinked polyurethane polymers below the heat degradation temperature of the polymer, which is prepared by reacting an organic polymeric compound having active hydrogen atoms which are reactive with NCO groups and a molecular weight of at least about 600 and a chain extending agent having a molecular weight less than 300 and an organic polyisocyanate in an amount such that the NCO to active hydrogen group ratio is from 1.02 to 1.2, the reactants, i.e., polymeric compound, organic polyisocyanate and chain extending agent being present in an equivalent ratio range of 1:1.4:0.38 to 1:9.4:6.8 respectively, until a solid crosslinked polymer results, particularly the solid polymer to reduce the particle size thereof, blending the ground solid polymer with from about 0.1% to about 5% by weight of an organic polyisocyanate and shaping, under pressure at a temperature below the heat degradation temperatures of the polymer.

By "crosslinked polyurethane polymer" is meant one that contains sufficient interconnected molecules, that it cannot be extruded at temperatures below its heat degradation temperature to produce a smooth uniform strand. By "heat degradation temperature" is meant the lowest temperature at which a chemical change occurs as evidenced by differential thermal analysis. By "particulating" is meant reducing the particle size of the crosslinked polymer by any suitable means such as chopping, grinding, cutting, scraping, grating, milling, abrading and the like. It is preferred that the particle size be less than one-quarter inch and preferably less than one-eighth inch.

Polyurethane polymers can achieve a crosslinked condition as described above by a number of mechanisms. They can crosslink because of excessive heating or by reaction with water in the air or in the reactants. For example, in casting techniques, the article is subjected to a curing cycle to cause crosslinking. It is to be understood that the process described herein relates to any crosslinked polyurethane polymer prepared as described, regardless of the manner in which the polymer became crosslinked. Thus, even scrap polyurethane polymers can be shaped using the process of this invention. The organic polyisocyanate may be dispersed by dissolving the isocyanate in a solvent and then applying the isocyanate solution to the crosslinked polyurethane particles by any suitable method such as spraying, dipping and the like. The solvent, which is preferably a low boiling solvent such as, for example, acetone is then subsequently removed by techniques known in the art such as "flashing off."

The isocyanate can also be dispersed throughout the polyurethane particles merely by adding the isocyanate in a liquid or granulated form and then agitating the mixture by any technique such as tumbling. This technique is preferred because of its simplicity.

Another modification of the procedure useful for solid polyisocyanates is to add the polyisocyanate to the urethane material as outlined immediately above until an intimate dispersion results and then to heat the mixture for a short period of time above the melting point of the isocyanate while continuing the agitation, to thus cause the melting of the isocyanate and to thereby coat the particles of the urethane with the polyisocyanate.

The isocyanate-coated polyurethane particles may then be shaped below the heat degradation temperature by normal thermoplastic techniques such as extrusion, injection molding, calendering and the like.

In accordance with this invention, any suitable organic polyisocyanate may be used in the preparation of the polyurethane material or as the organic polyisocyanate which is subsequently added in a small amount prior to the final shaping operation such as, for example, ethylene diisocyanate, ethylidene diisocyanate, propylene diisocyanate, butylene diisocyanate, cyclopentylene-1,3-diisocyanate, cyclohexylene-1,4-diisocyanate, cyclohexylene-1,2-diisocyanate, 2,4-tolylene diisocyanate, 2,6-tolylene diisocyanate, 4,4'-diphenylmethane diisocyanate, 2,2-diphenylpropane-4,4'-diisocyanate, p-phenylene diisocyanate, m-phenylene diisocyanate, xylylene diisocyanate, 1,4-naphthylene diisocyanate, 1,5-naphthylene diisocyanate, diphenyl-4,4'-diisocyanate, azobenzene-4,4'-diisocyanate, diphenyl sulfone-4,4'-diisocyanate, dichlorohexamethylene diisocyanate, tetramethylene diisocyanate, pentamethylene diisocyanate, hexamethylene diisocyanate, furfurylidene diisocyanate, 1-chlorobenzene-2,4-diisocyanate, tri-isopropyl benzene diisocyanate, p-isocyanatophenyl-thiophosphoric acid triester, p-isocyanatophenyl-phosphoric acid triester, 1-(isocyanatophenyl)-ethyl isocyanate, 4,4',4''-triisocyanato triphenylmethane, 1,3,5-triisocyanato benzene, 2,4,6-triisocyanate toluene, 4,4'-dimethyl diphenylmethane-2,2', 5,5'-tetraisocyanate and the like; polyisocyanates of the above type which are substituted by various substituents such as OR, $NO_2$, Cl where R is a lower alkyl such as methyl, ethyl, butyl, hexyl, the reaction products of the above isocyanates with less than equivalent quantities of polyhydroxyl compounds such as trimethylol propane, hexanetriol, glycerine, butanediol; polymerized isocyanates with isocyanurate rings and the like. It is preferred, however, that the same isocyanate which was used in the preparation of the polyurethane be used in the shaping step.

In the preparation of the crosslinked polyurethane polymers, any suitable organic compound containing active hydrogen atoms which are reacted with —NCO groups may be used such as, for example, hydroxyl polyesters, polyhydric polyalkylene ethers, polyhydric polythioacetals, polyacetals and the like.

Any suitable hydroxyl polyester may be used such as, for example, the reaction product of a polycarboxylic acid and a polyhydric alcohol. Any suitable polycarboxylic acid may be used in the preparation of the hydroxyl polyester such as, for example, adipic acid, succinic acid, sebacic acid, suberic acid, oxalic acid, methyladipic acid, glutaric acid, pimelic acid, azelaic acid, phthalic acid, terephthalic acid, isophthalic acid, 1,2,4-benzene tricarboxylic acid, thiodipropionic acid, maleic acid, fumaric acid, citraconic acid, itaconic acid and the like.

Any suitable polyhydric alcohol may be used in the reaction with the polycarboxylic acid to form a polyester such as, for example, ethylene glycol, propylene glycol, butylene glycol, amylene glycol, hexanediol, hexanetriol, glycerine, bis-(hydroxy-methyl-cyclohexane), trimethylol propane, pentaerythritol and the like. Of course, the hydroxyl polyester may contain urethane groups, urea groups, amide groups, chalkogen groups and the like. Thus, the hydroxyl terminated polyester includes, in addition to hydroxyl terminated polyesters, hydroxyl terminated polyester amides, polyester urethanes, polyether-esters and the like. Any suitable polyester amide may be used such as, for example, the reaction product of an amine or an amino alcohol with any of the compositions set forth for preparing polyesters. Any suitable amine may be used such as, for example, ethylene diamine, propylene diamine, tolylene diamine and the like. Any suitable amino alcohol such as, for example, beta-hydroxy ethylamine and the like may be used. Any suitable polyester urethane may be used such as, for example, the reaction of any of the above-mentioned polyesters or polyester amides with a deficiency of an organic polyisocyanate to produce a compound having terminal hydroxyl groups. Any of the polyisocyanates set forth hereinafter may be used to prepare such compounds.

Any suitable polyetherester may be used as the organic compound containing terminal hydroxyl groups such as, for example, the reaction product of an ether glycol and a polycarboxylic acid, such as those mentioned above, with relation to the preparation of polyesters. Any suitable ether glycol may be used such as, for example, diethylene glycol, triethylene glycol, 1,4-phenylene-bis-hydroxy-ethyl ether, 2,2'-diphenylpropane-4,4'-bis-hydroxy-ethyl ether and the like.

Any suitable polyhydric polyalkylene ether may be used such as, for example, the condensation product of an alkylene oxide with a small amount of a compound containing active hydrogen containing groups such as, for example, water, ethylene glycol, propylene glycol, butylene glycol, amylene glycol, trimethylol propane, glycerine, pentaerythritol, hexanetriol and the like. Any suitable alkylene condensate may also be used such as, for example, the condensates of ethylene oxide, propylene oxide, butylene oxide, amylene oxide and mixtures thereof.

The polyalkylene ethers prepared from tetrahydrofuran may be used. The polyhydric polyalkylene ethers may be prepared by any known process such as, for example, the process described by Wurtz in 1859 and in the "Encyclopedia of Chemical Technology," volume 7, pages 257–262, published by Interscience Publishers in 1951, or in U.S. Patent 1,922,459.

Any suitable polyhydric polythioether may be used such as, for example, the reaction product of one of the aforementioned alkylene oxides used in the preparation of the polyhydric polyalkylene ether with a polyhydric thioether such as, for example, thiodiglycol, 3,3'-dihydroxy propyl sulfide, 4,4'-dihydroxy butyl sulfide, 1,4-($\beta$-hydroxy ethyl) phenylene dithioether and the like.

Any suitable polyacetal may be used such as, for example, the reaction product of an aldehyde with a polyhydric alcohol. Any suitable aldehyde may be used such as, for example, formaldehyde, paraldehyde, butyraldehyde and the like. Any of the polyhydric alcohols mentioned above with relation to the preparation of hydroxyl polyesters may be used.

Any suitable chain extending agent containing active hydrogen atoms which react with —NCO groups and which are attached to a carbon atom through either oxygen, sulfur or nitrogen atoms may be used in the process of this invention such as, for example, ethylene glycol, propylene glycol, butylene glycol, 1,4-butanediol, butenediol, butynediol, xylylene glycols, amylene glycols, 1,4-phenylene-bis-beta-hydroxy ethyl ether, 1,3-phenylene-bis-beta-hydroxy ethyl ether, bis-(hydroxy-methyl-cyclohexane), hexanediol, thiodiglycol and the like; diamines including hydrazine, ethylene diamine, propylene diamine, butylene diamine, hexamethylene diamine, xylylene diamine, 3,3'-dichlorobenzidine, 3,3'-dinitrobenzidine and the like; alkanol amines such as, for example, ethanol amine, aminopropyl alcohol, 2,2-dimethyl propanol amine, 3-aminocyclohexyl alcohol, p-amino benzyl alcohol, glycerine, trimethylol propane, hexanetriol, pentaerythritol and the like. The reaction components, that is, the active hydrogen containing compound, the polyisocyanate and the chain extending agent are generally reactive in a ratio such that the —NCO to —OH ratio is from about 1.02 to about 1.2.

The invention will be further illustrated by the following examples in which parts are by weight unless otherwise specified.

Example 1

To about 100 parts of an hydroxyl polyester having a molecular weight of about 2000 and an hydroxyl number of about 56 and an acid number of about 1.5, prepared from about 11 mols of ethylene glycol and 10 mols of adipic acid are added about 40 parts of 4,4'-diphenylmethane diisocyanate and about 19 parts of 1,4-phenylene-bis-(beta-hydroxy ethyl ether). Each of these reactants is individually heated to about 100° C. This reaction mixture is immediately stirred for approximately one minute and then poured onto a heated table maintained at a temperature of about 100° C. Immediately after solidification occurs, which is a period of approximately 10 to 12 minutes, the solidified material is removed from the heated table and permitted to come to room temperature. The slab thus formed is then chopped to reduce the particle size thereof. This material is substantially linear, contains few crosslinks and can be readily extruded into uniform strands below the thermal heat degradation temperature as measured by differential thermal analysis.

This material is then subjected for 60 hours at 50% relative humidity as set forth in the following table. The percentages of 4,4'-diphenylmethane diisocyanate, as indicated, are then added by dry blending the two components in the solid condition. A control is made of the material as prepared in this example prior to any exposure to moisture. These values for the control are then compared with the properties where the material is exposed to 50% relative humidity for 60 hours and then dried for 2 hours at 110° C. with different percentages of 4,4'-diphenylmethane diisocyanate being added thereto. Upon attempting to extrude the polyurethane subjected to the moist atmosphere, it was found that smooth uniform extrusions could not be obtained below the heat degradation temperature. The properties of the blended material also exhibit improvement.

TABLE 1

| Amount of 4,4'-diphenylmethane diisocyanate | 0 | 0 | 0.6% | 1.5% | 2.4% |
|---|---|---|---|---|---|
| Exposure | None | (1) | (1) | (1) | (1) |
| Drying | (2) | (2) | (2) | (2) | (2) |
| Tensile strength, p.s.i | 5,900 | 3,800 | 4,000 | 6,300 | 6,400 |
| Aged Tensile Strength, p.s.i.[3] | 3,600 | 2,800 | 3,000 | 3,800 | 4,100 |
| Elongation, percent | 620 | 550 | 460 | 570 | 520 |
| Aged Elongation, percent [3] | 650 | 590 | 580 | 610 | 640 |
| Shore A hardness | 88 | 88 | 88 | 89 | 89 |
| Tear, pounds per inch | 610 | 550 | 610 | 560 | 400 |
| Set, percent | 25 | 23 | 13 | 16 | 13 |
| Aged Set, percent | 51 | 64 | 57 | 49 | 49 |
| Tensile Moduli, p.s.i./aged tensile moduli p.s.i.:[3] | | | | | |
| 100% | 1,110/960 | 1,140/920 | 1,170/940 | 1,200/1,000 | 1,280/1,060 |
| 200% | 1,360/1,320 | 1,550/1,230 | 1,620/1,230 | 1,690/1,330 | 1,840/1,400 |
| 300% | 1,880/1,820 | 2,150/1,630 | 2,360/1,660 | 2,460/1,820 | 2,670/1,940 |

[1] 60 hrs. at 50% R.H.
[2] 2 hour at 110° C.
[3] Aged 5 hours in a steam autoclave, 250° F., 15 p.s.i. steam.

Example 2

To about 100 parts of an hydroxyl polyester having a molecular weight of about 2000, an hydroxyl number of about 56 and an acid number of about 1.5 and prepared from about 11 mols of ethylene glycol and 10 mols of adipic acid are added about 9 parts of 1,4-butanediol and 40 parts of diphenylmethane diisocyanate. Prior to the intermixing of these three ingredients each is separately heated to a temperature of about 100° C. Upon the addition of the isocyanate to the polyester, butanediol mixture, mechanical mixing is conducted for a period of about one minute to insure the intimate contact of the ingredients. This reaction mixture is then cast onto a heated table maintained at a temperature of about 100° C. for about one hour. This material is then chopped to reduce the particle size thereof and introduced into an extrusion apparatus. High temperatures, above the heat degradation temperature, are necessary in order to obtain extrusions and the extruded material is clear and sticky, as opposed to an opaque white strand obtained in the control of Example 1. This condition indicates that the material is heated above the heat degradation temperature and that degradation has actually occurred in the extruder.

To 100 parts of this crosslinked material is added 3.0% of 4,4'-diphenylmethane diisocyanate. This isocyanate is in the flaked condition. That is, to 100 parts of the crosslinked material having a particle size of approximately ⅛ inch in cross section is added a solid flaked 4,4'-di-phenylmethane diisocyanate and the two components tumbled for approximately ½ hour. This mixture is then again extruded and the temperature required is 55° C. less than that where the isocyanate is not additionally added. This temperature is less than the heat degradation temperature. The extrusions are opaque white and compare in properties with the control of Example 1.

Example 3

About 100 parts of an hydroxyl polyester having a molecular weight of about 2000 and an hydroxyl number of about 56 and an acid number of about 1.5 prepared from 11 mols of ethylene glycol and 10 mols of adipic acid, 40 parts of diphenylmethane diisocyanate and about 19 parts of 1,4-phenylene-bis-beta-hydroxyethyl ether are heated individually to about 100° C. The reactants are then combined and intimately mixed for about one minute. The reaction mixture is then poured onto a tray maintained at about 100° C. until solidification results. The solidified material is then chopped to reduce the particle size. This material is substantially linear and produces smooth uniform strands upon extrusion.

The chopped articles are processed by injection molding to produce molded articles. The scrap runners and sprues, which contain substantial crosslinking because of the heat cycle in the injection molding machine are chopped and 0.5% by weight flaked, 4,4'-diphenylmethane diisocyanate based on the weight of scrap is added with tumbling. This treated material is then injection molded at temperatures below the heat degradation temperatures to produce shaped articles. This procedure of reprocessing the scrap is carried on for five cycles, each time treating the scrap from the previous run with 0.5% 4,4-diphenylmethane prior to remolding. Table 2 shows the improved properties obtained by this procedure even though the re-run material contains substantial crosslinking as compared to the virgin material. While the scrap of re-run 2, without the addition of MDI exhibits good physical properties, extrusions below the heat degradation temperature show the presence of crosslinks by the appearance of lumps on the surface of the strand. The blend of re-run 2 with MDI can be extruded easily below the heat degradation temperature to produce uniform strands.

TABLE 2

| Number of Regrinds | 0 [1] | 2 | 2 | 5 | 5 |
|---|---|---|---|---|---|
| MDI added | | No | Yes | No | Yes |
| Tensile Strength, p.s.i. | 5,900 | 6,500 | 7,700 | 4,080 | 6,250 |
| Aged [2] Tensile strength | 3,500 | 3,400 | 3,500 | 3,390 | 5,800 |
| Tensile Moduli, p.s.i.: | | | | | |
| 100% elongation | 1,190 | 1,170 | 1,140 | 1,080 | 1,270 |
| Aged [2] Tensile Modulus, p.s.i. | 1,140 | 1,040 | 1,060 | 1,040 | 1,260 |
| Elongation, percent | 670 | 660 | 640 | 650 | 580 |
| Aged [2] Elongation, percent | 580 | 600 | 610 | 640 | 650 |
| Elongation Set, percent | 30 | 25 | 20 | 46 | 13 |
| Aged [2] Elongation Set, percent | 40 | 45 | 40 | 55 | 28 |
| Shore "A" Hardness | 89 | 89 | 88 | 86 | 88 |
| Tear p./in. | 540 | 590 | 510 | 500 | 560 |
| Aged [2] Tear p./in. | 460 | 460 | 490 | 300 | 620 |

[1] Original material.
[2] Aged 5 hours in a steam autoclave, 250° F., 15 p.s.i. steam.

It is, of course, to be understood that any of the polyisocyanates mentioned above or any of the polyurethanes prepared from the reactants set forth above may be used throughout the examples for the specific compounds used therein.

Although the invention has been described in considerable detail for the purpose of illustration, it is to be understood that variations can be made by those skilled in the art without departing from the spirit of the invention and scope of the claims.

What is claimed is:

1. A method of shaping crosslinked polyurethane polymers below the heat degradation temperature of the polymer, said polymer being prepared by reaction of a polymeric organic compound containing active hydrogen atoms which are reactive with NCO groups, said organic compound having a molecular weight of at least 600, an organic polyisocyanate and an organic chain extending agent having a molecular weight less than about 300 and selected from the group consisting of glycols, diamines and amino alcohols until a solid substantially crosslinked polymer results, said reactants being reacted within the equivalent ratios of from about 1:1.4:0.38 to about 1:9.4:6.8 respectively, said polyisocyanate being used in an amount such that the NCO to active hydrogen ratio is from about 1.02 to about 1.2 which consists solely of the steps of particulating said solid polymer, blending with said particulated polymer from about 0.1% to about 5% by weight of an organic polyisocyanate and shaping said blend under pressure at a temperature less than the heat degradation temperature.

2. The process of claim 1 wherein the polyisocyanate is 4,4'-diphenylmethane diisocyanate.

3. The process of claim 1 wherein the polyisocyanate is tolylene diisocyanate.

4. The process of claim 1 wherein the polymeric organic compound is a polyester, a polyether, a polythioether or a polyacetal.

5. The process of claim 1 wherein the chain extender is a glycol.

6. The process of claim 1 wherein the chain extender is a diamine.

7. The process of claim 1 wherein the particulated crosslinked polyurethane has a particle size less than ¼".

References Cited

UNITED STATES PATENTS

| 2,625,531 | 1/1953 | Seeger | 260—75 XR |
| 2,729,618 | 1/1956 | Muller et al. | 260—75 |
| 2,937,151 | 5/1960 | Ten Broeck et al. | 260—2.3 |

DONALD E. CZAJA, *Primary Examiner.*

LEON J. BERCOVITZ, R. W. RAUCHFUSS, Jr.,
J. J. KLOCKO, *Assistant Examiners.*